Figures 1, 2, 3:
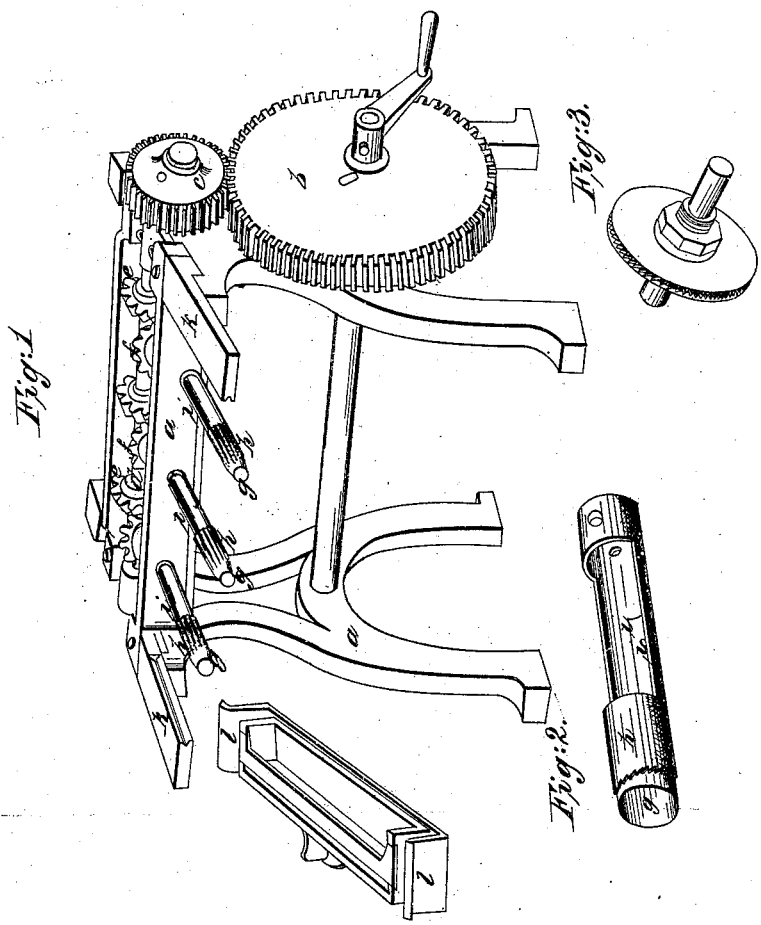

No. 8,422. G. HAMMER. PATENTED OCT. 14, 1851.
MACHINE FOR CUTTING CORK.

UNITED STATES PATENT OFFICE.

GEO. HAMMER, OF PHILADELPHIA, PENNSYLVANIA.

MACHINE FOR CUTTING CORKS.

Specification of Letters Patent No. 8,422, dated October 14, 1851.

*To all whom it may concern:*

Be it known that I, GEORGE HAMMER, of Philadelphia, in the county of Philadelphia and State of Pennsylvania, have invented certain new and useful Machinery for Cutting Corks, and that the following is a full, clear, and exact description of the principle or character which distinguishes it from all other things before known and of the ususal manner of making, modifying, and using the same, reference being had to the accompanying drawing, that forms a part thereof.

The peculiar nature of cork prevents its being cut and worked by the ordinary tools used for cutting wood except in cases where a shaving so thin is taken from the outside as to immediately relieve itself from the cutter. Its peculiar softness, elasticity and toughness requires a very thin instrument to cut it, the elasticity causes it to bind upon the tool when a deep incision is made to such a degree as to heat the tool and destroy its edge if worked rapidly besides requiring much power to move it.

Revolving crown cutters have been used for cutting corks for bottles consisting of a cylindrical tube with cutting edges on the end and made to revolve while the cork is pressed up to it, but this plan is found to be objectionable in consequence of the immense binding and friction before mentioned.

To obviate this difficulty is the object of my improvement which is accomplished by surrounding a cylindrical or crown cutter with a bur or rimmer or crown saw which are placed a short distance in the rear of the cutting edge so that when the thin cylindrical cutting edge is revolving and has entered a short space into the piece of cork it is followed by the bur or saw which removes the surrounding material and enables the smooth edge to penetrate without much friction or binding until it works entirely through and a smooth cylinder of cork is formed suitable for a bottle cork.

In Fig. 2 there is an enlarged cutter shown; the interior cutting cylinder ($g$) is detached from the outer crown saw or bur ($h$) and can be made to slide out more or less as occasion requires and can be taken out to sharpen the tools.

($i$) is the shank and ($i'$) the set screw. An opening is made in the side of the outer cylinder as shown in the drawing from which the cork is delivered. Any number of these cylinder cutters can be placed in a row as in Fig. 1, and driven by bevel gear or other device from a motive power.

Fig. 3, is a circular cutter for cutting slabs of cork and is composed of two thin metal cutters with thin bevel edges inward between which is a bur or saw for removing the portion between the cutters. These are screwed together on a mandrel and are easily separated for sharpening.

After the cork has been cut into slabs by the cutter Fig. 3, it is put into a box or clamp on a carriage ($l$) that slides up to the revolving cutters on ways ($k$) in the frame that supports the cutters; the box has a lateral motion on the carriage so that when one set of corks have been cut from the block a second series may be cut from the intervening spaces.

Having thus fully described my improved cork cutting machine what I claim therein as new and for which I desire to secure Letters Patent is—

The cylindrical crown cutters substantially as herein described formed of an adjustable cylindrical smooth knife surrounded by a bur cutter the relative positions being adjustable and the two being separable for shapening as fully set forth in the above description.

GEORGE HAMMER.

Witnesses:
 IGNAZ KOHLER,
 WILLIAM BELSHAR.